(12) United States Patent
Forster et al.

(10) Patent No.: US 8,981,936 B2
(45) Date of Patent: *Mar. 17, 2015

(54) METHOD OF MANUFACTURING CONDUCTIVE STRUCTURES

(75) Inventors: Ian J. Forster, Essex (GB); Christian K. Oelsner, Simpsonville, SC (US); Robert Revels, Heath Springs, SC (US); Benjamin Kingston, Suwanee, GA (US); Peter Cockerell, Pasadena, CA (US); Norman Howard, Essex (GB)

(73) Assignee: Avery Dennison Corporation, Glendale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/160,303

(22) Filed: Jun. 14, 2011

(65) Prior Publication Data

US 2012/0090877 A1 Apr. 19, 2012

Related U.S. Application Data

(60) Provisional application No. 61/354,380, filed on Jun. 14, 2010, provisional application No. 61/354,388, filed on Jun. 14, 2010, provisional application No. 61/354,393, filed on Jun. 14, 2010.

(51) Int. Cl.
*G08B 13/14* (2006.01)
*H01Q 3/00* (2006.01)
(Continued)

(52) U.S. Cl.
CPC .............. *H01P 11/003* (2013.01); *B32B 38/10* (2013.01); *G06K 19/07718* (2013.01);
(Continued)

(58) Field of Classification Search
CPC ....... G06K 7/0004; G06K 9/00; G06K 21/00; G06K 7/01; C07F 7/08061; C07F 7/0813; C07F 7/082; C07F 7/0826
USPC ........ 428/195.1, 347, 209; 343/700 MS, 786, 343/732, 733, 755, 757; 340/572.1; 235/380
See application file for complete search history.

(56) References Cited

U.S. PATENT DOCUMENTS 2,961,746 A 11/1960 Lyman
3,938,931 A 2/1976 Emmel
(Continued)

FOREIGN PATENT DOCUMENTS

CN 101300591 11/2008
JP 2001127410 5/2001
(Continued)

OTHER PUBLICATIONS

"Finecut Narrow Web Laser Cutting System," Spartanics®, www.spartanics.com, 2 pages, no date shown.

(Continued)

*Primary Examiner* — Cathy Lam
(74) *Attorney, Agent, or Firm* — Avery Dennison Retail Information Services LLC

(57) ABSTRACT

The present invention relates to a method of manufacturing a web of a plurality of conductive structures which may be used for example to produce an antenna, electronic circuit, photovoltaic module or the like. The method involved simultaneously patterning at least one pattern in a conductive layer using a plurality of registration marks. The registration marks serve to align and guide the creation of the plurality of conductive structures. Optical brighteners may also be utilized within the adhesive layer and the registration marks of the present invention in order to detect the location where conductive structures are to be placed.

16 Claims, 6 Drawing Sheets

(51) Int. Cl.
*H01P 11/00* (2006.01)
*B32B 38/10* (2006.01)
*G06K 19/077* (2006.01)
*G06K 19/07* (2006.01)
*B23K 26/36* (2014.01)
*B32B 37/12* (2006.01)
*B32B 38/00* (2006.01)

(52) U.S. Cl.
CPC ..... *G06K 19/07749* (2013.01); *G06K 19/0775* (2013.01); *G06K 19/07754* (2013.01); *G06K 19/07786* (2013.01); *G06K 19/0723* (2013.01); *B23K 26/367* (2013.01); *B32B 37/12* (2013.01); *B32B 38/145* (2013.01); *B32B 2305/10* (2013.01); *B32B 2307/302* (2013.01); *B32B 2317/12* (2013.01); *B32B 2519/02* (2013.01)
USPC ............ 340/572.1; 428/195.1; 428/209; 343/732; 343/733; 343/755; 343/757

(56) References Cited

U.S. PATENT DOCUMENTS

| | | | |
|---|---|---|---|
| 4,664,966 A * | 5/1987 | Bailey et al. | 428/203 |
| 4,745,288 A | 5/1988 | Hurley et al. | |
| 5,161,276 A | 11/1992 | Hutton et al. | |
| 5,434,917 A * | 7/1995 | Naccache et al. | 713/176 |
| 5,566,441 A | 10/1996 | Marsh et al. | |
| 5,645,932 A * | 7/1997 | Uchibori | 428/347 |
| 5,725,935 A * | 3/1998 | Rajan | 428/195.1 |
| 5,759,422 A | 6/1998 | Schmelzer et al. | |
| 5,800,724 A | 9/1998 | Habeger et al. | |
| 6,147,662 A | 11/2000 | Grabau et al. | |
| 6,191,382 B1 | 2/2001 | Damikolas | |
| 6,259,369 B1 * | 7/2001 | Monico | 340/572.8 |
| 6,265,977 B1 * | 7/2001 | Vega et al. | 340/572.7 |
| 6,320,556 B1 | 11/2001 | Cyman et al. | |
| 6,352,497 B1 | 3/2002 | Hensley et al. | |
| 6,400,323 B2 | 6/2002 | Yasukawa et al. | |
| 6,451,154 B1 | 9/2002 | Grabau et al. | |
| 6,466,131 B1 | 10/2002 | Tuttle et al. | |
| 6,509,837 B1 | 1/2003 | Tuttle et al. | |
| 6,609,844 B1 | 8/2003 | Petteruti et al. | |
| 6,698,116 B2 * | 3/2004 | Waldron | 40/124.11 |
| 6,781,508 B2 | 8/2004 | Tuttle et al. | |
| 6,839,029 B2 | 1/2005 | Mendolia et al. | |
| 6,988,666 B2 | 1/2006 | Appalucci et al. | |
| 7,014,729 B2 | 3/2006 | Grabau et al. | |
| 7,047,624 B2 | 5/2006 | Vogt | |
| 7,116,227 B2 | 10/2006 | Eckstein et al. | |
| 7,122,235 B2 * | 10/2006 | Bourdelais et al. | 428/40.1 |
| 7,176,053 B1 | 2/2007 | Dimmler | |
| 7,250,868 B2 | 7/2007 | Kurz et al. | |
| 7,256,738 B2 | 8/2007 | Mizukawa et al. | |
| 7,283,035 B2 | 10/2007 | Tuttle et al. | |
| 7,284,704 B2 | 10/2007 | Lubow | |
| 7,300,863 B2 | 11/2007 | Pennaz et al. | |
| 7,309,007 B2 * | 12/2007 | Kean | 235/380 |
| 7,345,575 B2 | 3/2008 | Tuttle et al. | |
| 7,374,095 B2 * | 5/2008 | Blank et al. | 235/486 |
| 7,463,150 B2 * | 12/2008 | Rajan | 340/572.1 |
| 7,477,194 B2 | 1/2009 | Coleman et al. | |
| 7,497,004 B2 | 3/2009 | Cote et al. | |
| 7,520,001 B2 | 4/2009 | Gotoh et al. | |
| 7,533,455 B2 * | 5/2009 | Wehr | 29/600 |
| 7,546,671 B2 | 6/2009 | Finn | |
| 7,621,451 B2 * | 11/2009 | Berson | 235/435 |
| 7,633,035 B2 | 12/2009 | Kirmeier | |
| 7,641,112 B2 * | 1/2010 | Jensen et al. | 235/380 |
| 7,681,301 B2 | 3/2010 | Rodgers | |
| 7,836,588 B2 * | 11/2010 | Laksin et al. | 29/847 |
| 7,855,645 B2 * | 12/2010 | Rajan | 340/572.1 |
| 7,893,385 B2 * | 2/2011 | Rodgers | 219/121.69 |
| 7,930,815 B2 | 4/2011 | Coleman et al. | |
| 7,997,495 B2 | 8/2011 | Rodgers | |
| 8,033,477 B2 * | 10/2011 | Jones et al. | 235/492 |
| 8,132,734 B2 * | 3/2012 | Lazarowicz et al. | 235/487 |
| 8,146,830 B2 * | 4/2012 | Johnson et al. | 235/492 |
| 8,178,028 B2 * | 5/2012 | Gandhi | 264/400 |
| 8,202,567 B2 | 6/2012 | Kohnle et al. | |
| 2002/0018880 A1 | 2/2002 | Young | |
| 2003/0136503 A1 | 7/2003 | Benoit et al. | |
| 2004/0221952 A1 | 11/2004 | Damikolas | |
| 2005/0001785 A1 | 1/2005 | Ferguson et al. | |
| 2005/0183817 A1 | 8/2005 | Eckstein et al. | |
| 2005/0274811 A1 | 12/2005 | Zercher | |
| 2007/0040686 A1 | 2/2007 | Reis | |
| 2007/0094862 A1 | 5/2007 | Posamentier | |
| 2007/0130754 A1 | 6/2007 | Fein | |
| 2007/0171129 A1 | 7/2007 | Coleman et al. | |
| 2007/0188327 A1 | 8/2007 | Keeton et al. | |
| 2007/0246843 A1 | 10/2007 | Yang et al. | |
| 2008/0047130 A1 | 2/2008 | Lin et al. | |
| 2008/0083706 A1 | 4/2008 | Kirmeier | |
| 2008/0120834 A1 | 5/2008 | Laksin et al. | |
| 2008/0128397 A1 | 6/2008 | Gandhi | |
| 2008/0217309 A1 | 9/2008 | Rodgers | |
| 2010/0071831 A1 | 3/2010 | Peter et al. | |
| 2010/0089535 A1 | 4/2010 | Hosono et al. | |
| 2010/0103238 A1 | 4/2010 | Neuhard et al. | |
| 2010/0320275 A1 * | 12/2010 | Fu | 235/492 |
| 2011/0220276 A1 | 9/2011 | Coleman et al. | |
| 2012/0060359 A1 | 3/2012 | Forster et al. | |

FOREIGN PATENT DOCUMENTS

| | | |
|---|---|---|
| JP | 4334704 | 9/2009 |
| WO | 2008148527 | 12/2008 |
| WO | 2009118455 | 10/2009 |

OTHER PUBLICATIONS

"Finecut Laser Cutting Systems," Spartanics®, www.spartanics.com, 4 pages, no date shown.
"Fineprint Flatbed Screen Printing Line, Roll-to-Roll," Spartanics®, www.spartanics.com, 2 pages, no date shown.
"Cold Foil for Dummies®," J. Michael Rivera, Wiley Publishing, Inc., copyright 2004.
International Search Report and Written Opinion dated Oct. 6, 2011 for International Application No. PCT/US2011/040379.
International Search Report and Written Opinion dated Oct. 6, 2011 for International Application No. PCT/US2011/040383.
International Search Report and Written Opinion dated Oct. 6, 2011 for International Application No. PCT/US2011/041743.
International Search Report and Written Opinion dated Oct. 6, 2011 for International Application No. PCT/US2011/040386.
Partial European Search Report dated May 16, 2014 for International Application No. EP13005668.

* cited by examiner

METHOD OF MANUFACTURING CONDUCTIVE STRUCTURES

CROSS-REFERENCE TO RELATED APPLICATION

The present application claims the benefit of U.S. Provisional Application Nos. 61/354,380 filed Jun. 14, 2010, 61/354,388 filed Jun. 14, 2010, and 61/354,393 filed Jun. 14, 2010, all of which are incorporated herein by reference in their entireties.

FIELD OF THE INVENTION

The present invention relates to the field of conductive assemblies and methods of making such assemblies. More specifically, the present invention relates to a method for producing patterned conductive structures by laser cutting. The conductive structures may be used in the production of antennas for RFID circuits, photovoltaic arrangements, reflective assemblies, or other constructions.

BACKGROUND OF THE INVENTION

Conductive laminates such as foil laminates are used in a number of applications, ranging from containers for microwave packages to smart cards. Such laminates have regularly been created by die cutting, stamping, and other mechanical processes that generally lend themselves well to high speed situations in which a relatively simple shape or pattern can be created.

The increased demand for circuits has created a need for a manufacturing method that can quickly and efficiently produce such circuits. Once such method is disclosed in U.S. Patent Application No. 2007/0171129 A1. This method includes the steps of providing a reinforced metal foil laminate, having a metal foil layer bonded to a reinforcement layer, and a carrier layer bonded to the metal foil laminate. The method includes the step of using a rotary die cutter to cut an antenna pattern through the metal foil laminate to the carrier layer. The method concludes by removing an undesired matrix portion of the reinforced metal foil laminate to provide a metal foil laminate antenna disposed on the carrier layer.

A rotary die cutter has been used to produce various structures because it is both fast and inexpensive. However, rotary die cutters have poor resolution and are currently limited to having a minimum distance between cut lines of about 1 mm. An additional problem with using a rotary die cutter to cut a construction requiring high precision and tolerance is that the cylindrical die used by the rotary die cutter cannot be quickly or easily changed. Accordingly, the design is not readily changeable, and thus it is often not economically feasible to produce small batches of a particular design because of the need to constantly change out die heads. Furthermore, any change in design would require a large lead-time, as a new cylindrical die must be manufactured each time the design is changed. This can create a large inventory of die heads, the storage of which can occupy valuable factory floor space.

What is needed, therefore, is an efficient system and method to produce intricate patterns in conductive materials without the foregoing drawbacks associated with conventional cutting devices.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to using a laser to cut one or more patterns in a conductive layer to create structures that may be subsequently modified for use in a variety of applications such as with radio frequency identification devices (RFID). An exemplary laser suitable for use in the present invention includes an ytterbium laser, which pulses at about 48 kHz with a wavelength of approximately 1024 nm. Ideally, the energy of the laser is not apparent from the surface of the substrate. This means that the use of the laser does not cause die strikes, discolorations or any surface roughness.

In the present invention optical brighteners, or other registration marks or initiators (collectively referred to as registration marks) may be utilized in cooperation with an adhesive pattern or layer in order to determine the placement or position of the registration marks to be used in the formation of the conductive structures.

In an exemplary embodiment of the present invention, a method is provided for patterning a plurality of registration marks and patterning simultaneously a conductive layer over a pre-patterned layer of adhesive. The registration marks are detected via a laser. Once detected, a cutting mechanism is triggered that cuts a pattern or plurality of patterns in the conductive layer in order to form a conductive structure such as an antenna. In an alternate embodiment of the foregoing, registration marks can be used to place a microprocessor chip which then in turn can be used by the laser cutter in locating the area to form the antenna pattern.

In a still further embodiment, a first pattern which may be formed by a cold foil process or die cutting and then subsequently finished by a laser cutting more intricate patterns to provide a final pattern.

In one embodiment of the present invention, a conductive intermediate assembly is provided that includes a substrate that has a first and second face. A pattern of adhesive is provided on the first face of the substrate. A conductive layer, such as a metal foil, is applied over the pattern of adhesive. The conductive layer has at least a first pattern formed in the layer with the at least first pattern corresponding to the pattern of adhesive.

The patterns used in connection with practicing the present invention are formed by laser cutting. The laser cutter is controlled by a computer and in addition to the foregoing, the computer driven system may be used to create marketing or advertising indicia, such as symbols, names, trademarks, logos, manufacturing information, other intricate patterns and the like. The system can also be used to control a printing or imaging press such as an ink jet or laser printer to provide additional indicia to the substrate on which the conductive structure has been formed. Thus, a complete system having a relatively small foot print is provided to generate small batches or quantity of customized materials such as hang tags, tickets, tags and the like.

In another embodiment, a substrate is provided having a first part and a second part, with a conductive pattern formed by laser cutting provided in the first part and indicia such as a retailer logo or name provided in the second part. The indicia is provided by laser die cutting. The substrate may be provided with first and second portions that may be folded over on one another to form a hang tag, ticket or label.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, it is provided for the purpose of illustrating the general features of the invention.

The present invention relates to a unique and efficient method for producing intermediate assemblies that may be used in the creation of intricately formed circuits, antennas, photovoltaic modules, and other specialized conductive structures. The present invention provides a method in which registration marks are utilized for alignment purposes of a laser cutter and a pattern for at least one conductive structure may be formed in a conductive material. The present invention also discloses the use of optical brighteners as registration marks or in addition to registration marks to indicate the placement of conductive structures.

The printing of registration marks and coating of adhesive may also occur simultaneously, substantially simultaneously, or sequentially in order to be able to quickly and efficient produce conductive structures in accordance with the present invention.

Figure 1:
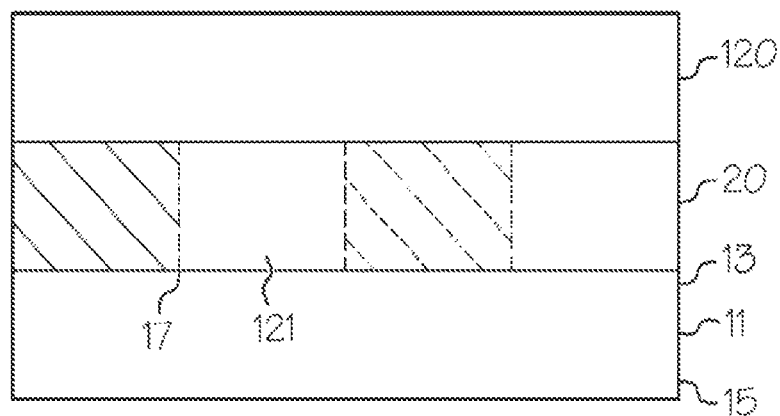
FIG. 1 depicts a cross-section of the web in which the foil layer adheres only to areas of adhesive provided in a pattern.
Figure 1A:
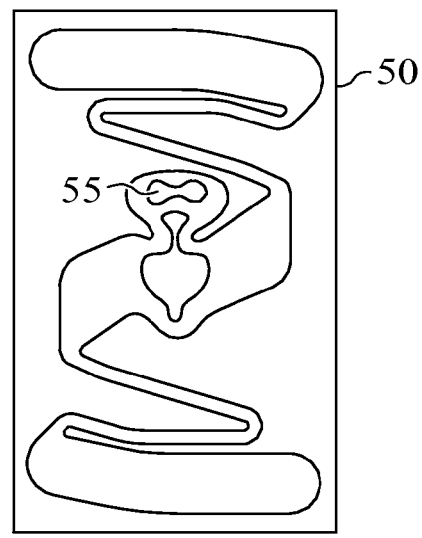
FIG. 1A shows an exemplary conductive structure produced in accordance with the present invention.

The present invention may also, or in the alternative, use registration marks for the placement of a microprocessor chip prior to the commencement of the laser ablating or cutting (see FIG. 1A). In this embodiment, the laser can utilize the chip as a registration mark to guide the laser in the cutting of the conductive pattern in the foil layer.

FIG. 1 illustrates a cross-sectional view of the web 10 of the present invention. A substrate 11 having a first face 13 and a second face 15 has an adhesive layer 20 provided over at least a portion the first face 13 of the substrate 11. The adhesive layer 20 in one embodiment is provided in a pattern which will correspond to the shape of the conductive structure that is to be formed in the foil or conductive laminate (see FIG. 1A). A conductive layer 120 is then provided over the adhesive layer 20. The conductive or foil layer 120 adheres only to those areas of the adhesive which are provided in a pattern. That is, portions of the foil layer will not be attached to the substrate, while other portions, due to the patterning of the adhesive will be adhered to the substrate. The adhesive pattern can be seen, for example in FIG. 1, terminating at line 17, such that a portion of the foil 120 is not adhered to the substrate 11, designated by the non-adhesive area 121. An exemplary conductive pattern 50 is shown in FIG. 1A. The conductive pattern 50 has an area 55 which may be used to attach a microprocessor chip or strap to the structure formed.

As used herein, the term "conductive layer" may include a foil layer, or a foil combined with one or more additional layers such as a reinforcing layer, carrier layer, adhesive, cover layer or the like.

Figure 4:
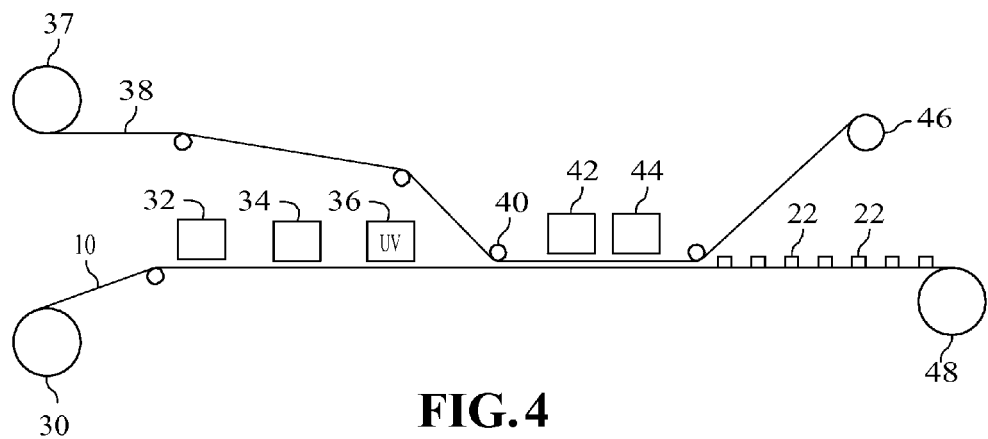
FIG. 4 is a schematic showing the process for creating the web depicted in FIG. 1.
Figure 5:
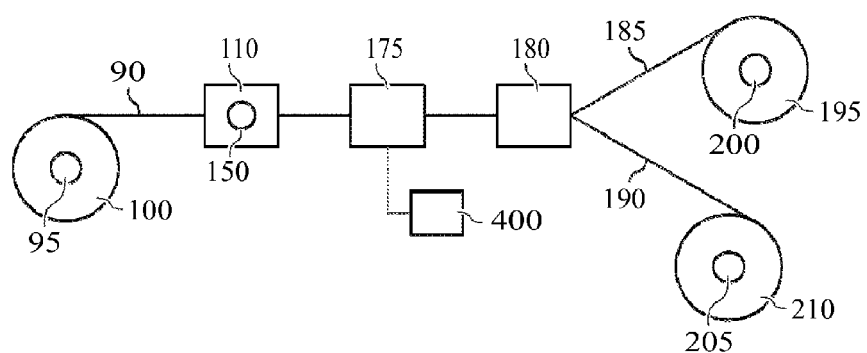
FIG. 5 depicts a roll-to-roll process for manufacturing a standard conductive structure in accordance with an aspect of the present invention.

The substrate 11 may be made out of any material or combination of materials that allow the substrate 11 to be flexible so as to facilitate the manufacture of the substrate 11 as a continuous web that can be wound into a roll form for use in a roll-to-roll process (see FIGS. 4 and 5). Examples of such substrate materials include, but are not limited to, polyester films, polyethylene terephthalate films, polyimide films, fabric (woven, non-woven, synthetic, natural), cloth or paper materials (card stock paper, bond paper, recycled paper, etc.).

It should be understood that while the present invention is described as a roll-to-roll arrangement using a web, the invention may be practiced in a sheet feed configuration, where a stack of sheets of material are used as the supply of starting material.

The conductive layer 120 may be made out of any suitable conductive material, such as aluminum, copper, silver, gold, alloys of metals and the like. Combinations of conductive materials may be used. In addition the conductive material may be created by printing conductive ink, etching, or other suitable processes.

The adhesive layer may be a general-purpose permanent pressure-sensitive adhesive, pressure-activated adhesive, or other suitable adhesive. The adhesive layer may be applied to the substrate through pattern coating or printing, such as with ink jet, flexographic printing, full coating, or other suitable method.

Figure 2:
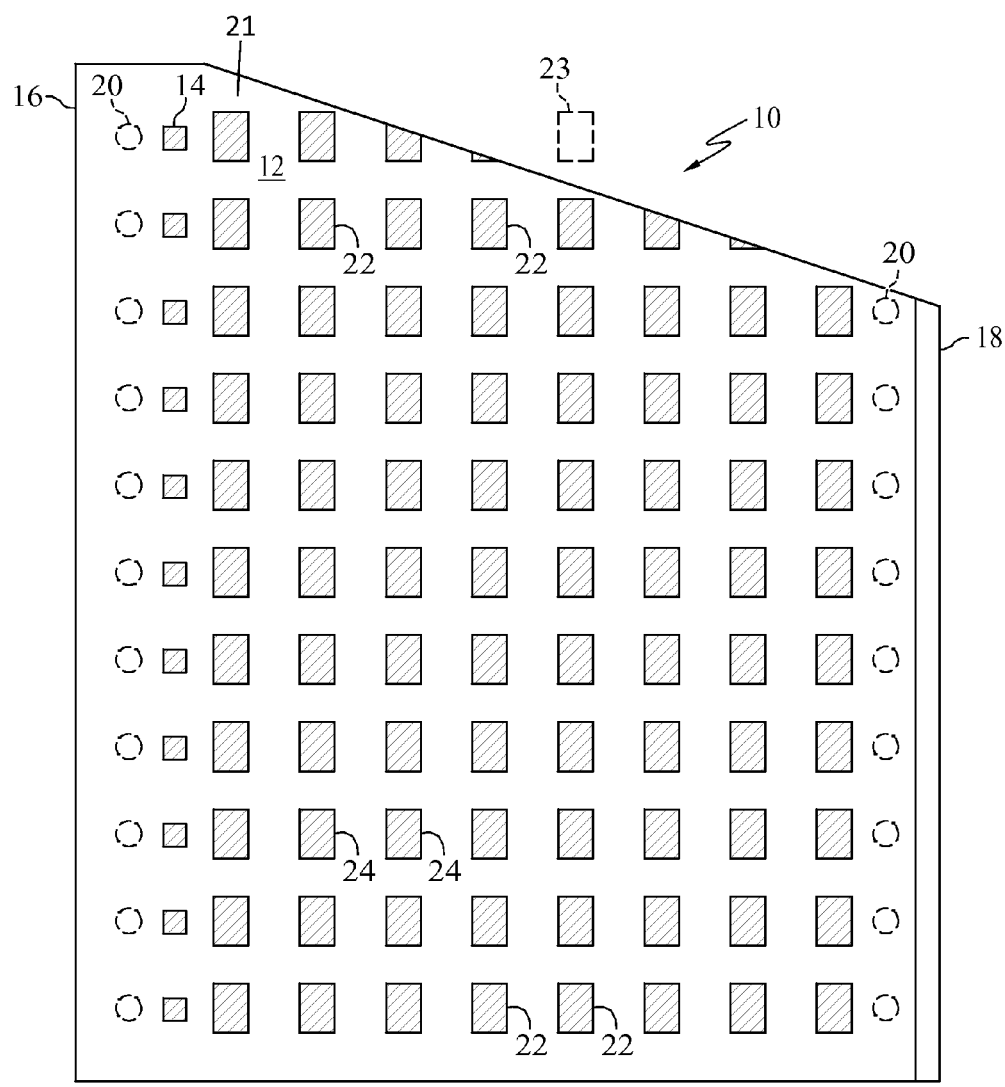
FIG. 2 depicts a partial selection of a web after patterning by a cutting mechanism having a plurality of conductive laminates disposed on the surface of the web.

Reference is now directed to FIG. 2 which shows a web 10 of the present invention after patterning by a cutting mechanism, such as a laser. A web 10 is provided having a number of conductive structures 22 provided on the upper surface 12 of the web 10, once the remaining matrix, the unconnected portions of the conductive foil, has been stripped away. In order to form the conductive structure 22, the web 10 was provided with a series of printed registration marks 14 along one of the first and second longitudinally extending side edges 16 and 18 of the web 10 on top of the adhesive (not shown). It should be understood that registration marks may be provided along both sides or edges of the substrate, or in other positions of the substrate.

The registration marks 14 may also be provided in one embodiment on the first face 13 of the substrate 11 prior to the coating of the adhesive on the first face 13 of the substrate 11 as long as a transparent coat of adhesive is used so as to allow for detection of the registration marks 14. That is, the transparent coating, if it is applied over the marks, would allow the marks to be visible, such as by a machine vision system scanning, through the coating. The registration marks 14 assist in alignment of the conductive structures 22 and are patterned by a printer. Typically, registration marks 14 are provided in a machine direction, that is the direction the web or sheet travels through the machine. The registration marks may be provided with optical brighteners in order to facilitate detection of the marks.

Figure 3:
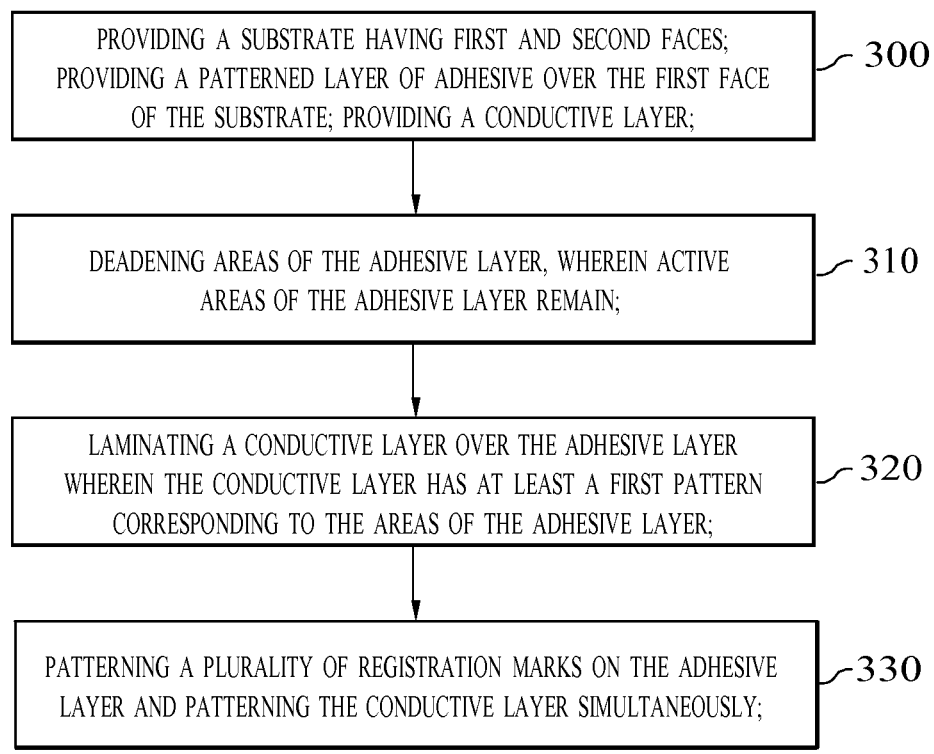
FIG. 3 illustrates a methodology of creating the conductive structures of the present invention.

FIG. 3 provides a block diagram for an exemplary method for creating a plurality of conductive structures 22 on a web 10 of the present invention by applying a plurality of registration marks 14 and at least one conductive pattern 24. In step 300, a substrate 11 is provided that has first and second faces. An adhesive layer 20 (shown in phantom and uncovered by the conductive layer 22 for illustration purposes) is provided over the first face 13 of the substrate 11. A layer of adhesive 20 is provided over the substrate 11 first face 13 either in a pattern corresponding to the structures to be formed or alternatively, flood coated. A series of registration marks are also printed on the substrate first face. A conductive layer 120 (see FIG. 1) is provided over the adhesive layer 20.

In one embodiment where the adhesive is flood coated on the substrate and not provide in specific patterns, the areas of the adhesive corresponding to the patterns to be formed are deadened at step 310 where conductive structures are not to be formed. In step 301, certain areas of the adhesive layer are "deadened," by a UV source or a print varnish (not shown). As a result, the adhesive layer 20 will have separate areas designated as "dead" and "active." An active area of adhesive will retain its tackiness and allow the conductive or foil layer to stick to the adhesive, whereas a deadened area loses its tackiness and the foil or conductive layer will not adhere to the adhesive. By deadening certain areas of the adhesive layer 20, namely, those areas 21 around the locations where the conductive structures 22 are to be formed by the active areas of the adhesive layer 20 will be substantially surrounded by deadened adhesive. A cutting tool is used to cut the patterns 24 in the conductive layer 120 for a conductive structure 22. In a preferred embodiment, the cutting mechanism is a laser. It should be understood however, that the cutting pattern 24 can be accomplished by using other cutting devices, which may pre-cut a portion of the pattern prior to cutting by the laser of the more intricate patterns.

At step 320 the conductive layer is laminated or adhered to those portions of the adhesive that remain tacky. At step 330, a plurality of patterns are cut in the adhesive layer to form a plurality of conductive structures.

The excess material of the conductive layer 120 that is provided over the deadened areas of the adhesive layer 20 is removed by stripping the remaining matrix from the conductive layer 120 from the deadened areas of the adhesive layer 20. It should be pointed out that the matrix, particularly if a metal foil is used, is 100% recyclable. In another embodiment, the adhesive may be patterned onto the first face 13 of the substrate 11, which means that a plurality of geometrical shapes are patterned onto the first face of the substrate, or that specified portions of the first face of the substrate are covered with adhesive wherein other portions of the first face of the substrate are not covered with adhesive. By patterning the adhesive onto the first face 13 of the substrate 11, deadening of certain areas of the adhesive with a UV source or print varnish is unnecessary.

In an embodiment of the present invention, optical brighteners 23 in cooperation with registration marks are utilized in order to trigger the cutting mechanism to cut at least one pattern 24 in the conductive layer 120 for a conductive structure 22. Optical brighteners 23 may be provided in or around the area of the registration marks 14, that is along the marginal or side areas to trigger the laser to begin cutting the conductive substrates. In one embodiment, optical brighteners 23 may be mixed in the pattern of adhesive layer 20. In another embodiment a pattern of optical brighteners 23 may also be printed on top of pattern of adhesive layer 20 rather than being mixed in the adhesive layer 20 itself. In another embodiment, a specific pattern of optical brighteners 23 may be printed on the first face 13 of the substrate 11 prior to the adhesive layer 20 being provided over the first face 13 of the substrate 11 then a clear or at least a partially transparent adhesive is applied over the substrate so that the optical brighteners 23 are visible through the adhesive layer 20 and may be recognized the cutting apparatus.

Additional optical brighteners 23 may also be provided in a particular shape or around the area where the conductive structure 22 to be formed, so that supplemental laser cutting can take place such as the cutting of areas to form the chip attachment or placement portion.

The optical brighteners 23 may be provided in a specified pattern such as columns and/or rows in certain geometric shapes in order to trigger the cutting mechanism to cut a pattern at each location of an optical brightener registration mark for a conductive structure 22 in the conductive layer 120. The conductive layer 120 when laid over the adhesive layer 20 does not cover the area occupied by the registration marks 14 and/or optical brighteners 23 so as to allow the cutting mechanism to detect the registration marks in order to align the plurality of conductive structures with the registration marks. When the optical brighteners 23 are used as registration marks 14, it is possible to pattern the adhesive 20 and the registration marks 14 simultaneously thereby providing a more efficient method by reducing the number of steps needed for constructing conductive structures.

The registration marks 14 may be printed using a wide variety of inks on top of the individual optical brighteners 23. In an alternative embodiment, the registration marks 14 of the present invention, may also be created from portions of the conductive layer or fragments of foil laminate which are positioned in a particular area to be detected by the cutting device.

In an exemplary embodiment, the optical brighteners 23 are a fluorescent powder, of approximately 1% of the total weight of the pattern of adhesive and more preferably the fluorescent powder comprises 0.5% the total weight of the adhesive. The optical brighteners 23 and the adhesive layer 20 may be created from the same printing plates and blanket in order for the optical brighteners 23 and the pattern of adhesive 20 to be generated simultaneously. In other embodiments of the present invention, the optical brighteners 23 may be a select color of fluorescent powder or may include UV detectable elements.

The conductive layer 120 has at least one pattern 24 corresponding to at least a portion of the adhesive layer 20. The present invention contemplates the possibility of a plurality of patterns, that is patterns produced in single or multiple lanes. The cutting mechanism can be used to create an additional area for the attachment of integrated circuit, and finish cutting of additional patterns so as to add some variability to the design. With respect to placement of the chip, straps can be placed on the foil having to facilitate alignment of the chip so that it can be more readily connected to an attachment point. The attachment pattern 24 is approximately 100 micron wide.

In another embodiment, a further pattern may be produced in another area of the conductive layer to form a bar code, logo of a company, or some other variable data or indicia.

Attention is now directed to FIG. 4 which provides a possible schematic for producing the web 10 as illustrated in FIG.

1. The web of material, such as paper, plastic, cloth or fabric, is unwound from a roller 30. A printer 32 can be used to apply registration marks to the web for subsequent scanning by the adhesive coating and cutting stations. An adhesive applicator 34 applies the adhesive layer which may have distinct adhesive patterns 20 that will correspond to the conductive structures or the adhesive may be applied as a full coat of the web. Next, where the adhesive layer has been applied as full coat or flood coated, a UV source 36 is directed over the adhesive to deaden select areas of the adhesive, those areas outside the areas corresponding to the patterns to be created in the conductive layer, leaving active areas where the conductive structures 22 will be formed. A roller 40 laminates a conductive layer 38 such as a foil which is fed from unwind 37 source to the active areas of the adhesive coated web 10. A pattern 24 is cut via a laser cutter 42 in the conductive layer. It should be noted that the energy from the laser does not score or mark the underlying substrate web.

In an alternative embodiment, a first cut pattern can be produced in the foil layer such as by a rotary die cutter or through a cold foil process. As used herein an exemplary cold foil process refers to printing an adhesive or other curable pattern onto a substrate then applying a foil layer over the pattern, laminating the foil to the pattern so that the foil sticks to the pattern and then stripping away the foil, leaving the pattern on the substrate covered with the foil layer. The cold foil process can occur either before or after the final cutting by the laser cutter.

Once the pattern 24 is cut into the conductive layer or foil 38, the remaining portions of the conductive layer that are not in contact with the active areas of the adhesive layer is stripped off by a stripper 44 and rewound 46. The collected material, for example foil, is 100% recyclable as the foil has not been contaminated with the adhesive as the adhesive has been deadened prior to application or, if patterned adhesive was used, not applied. The web 10 is then wound at 48. The web 10 after forming the individual conductive structure or foil laminates 22 may be sent through a cutter (not shown) to separate the individual conductive structures or foil laminates from one another or the web may be collected and cut at a later date. The web 10 may also undergo a second or third or more cutting depending on the particular end use to be made of the conductive substrate.

The laser cutter 42 may also cut indicia into the foil such as trademarks, trade names, logos or other information in a separate area so as to add some variability and personalization to the web as will be described herein.

Figure 7:
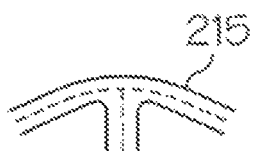
FIG. 7 illustrates a laser cutting path of the present invention.

A further schematic illustration of a roll to roll process by which a web 10 of conductive structures 22 may be created is illustrated in FIG. 5. A web 90 is dispensed via an unwinder 95 from a web roll 100 and fed to a first cutting stating, e.g. a laser, rotary cutter or cold foil roller or die 100 which has a rotary die 150 if the station is a die cutting or cold foil unit. The first cutter may be used to remove large segments of material from the conductive structure to be formed. The web 90 exits a first cutter 110, and is fed into a laser cutter 175. A laser cutting path 215, as illustrated in FIG. 7, is programmed into a computer that controls the laser cutter 175. The computer controlled laser cutter can perform all the cutting that is necessary or it may alternatively be reserved for cutting more intricate patterns or for any finishing cutting.

Continuing with FIG. 5, the web 90 exits the laser cutter 175 and is fed into a stripper 180, if necessary. When provided, the stripper 180 separates the matrix web or remaining conductive material or foil 190 from the formed conductive structures 22 to create a conductive structure web 185. The conductive structure web 185 has a succession of structures 22 disposed on a carrier layer 185. The conductive structure web 185 is wound into a roll 195 by a first rewinder 200, while the matrix web 190 is wound into a matrix roll 210 by a second rewinder 205.

Figure 6:
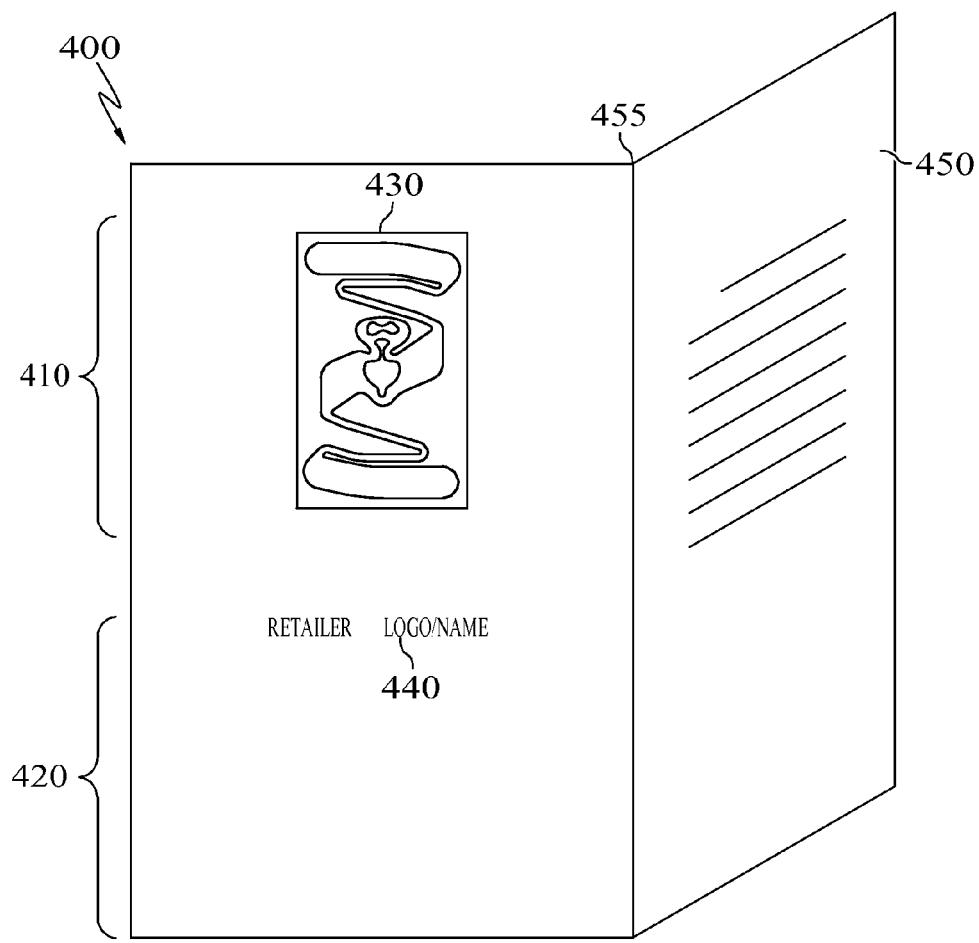
FIG. 6 provides a substrate produced in accordance with the present invention.

Reference is now directed to FIG. 6, which includes a substrate 400, having a first part 410 and a second part 420. The first part 410 is provided with a conductive structure 430 such as an RFID antenna/device and the second part 420 is provided with indicia 440 such as a retailer name, logo or other information such as trademarks, trade names, designs, patterns or the like. Each of the conductive structure 430 and indicia is produced by laser cutting.

The substrate 400 may also include first and second portions 440, 450, respectively. The first portion 440 is made up of the first and second parts 410, 420, respectively, and the second portion 450 may be folded over the first portion 440 along a fold line 455 to form one of a hang tag, ticket, label or the like. The second portion 450 may also be provided with indicia 460 which may relate to the consumer item to which the substrate as a hang tag for example is attached.

It will thus be seen according to the present invention a highly advantageous method of manufacturing a conductive substrate has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A web of conductive structures comprising:
    a substrate having first and second faces;
    a layer of adhesive provided over the first face of the substrate;
    a plurality of patterned registration marks provided on top of the adhesive layer, the plurality of registration marks each provided with an optical brightener;
    a conductive layer provided over the adhesive layer and spaced apart from the plurality of patterned registration marks such that the conductive layer does not cover the plurality of patterned registration marks;
    at least one conductive structure formed by laser cutting of the conductive layer; and
    wherein the at least one conductive structure is aligned by reference to at least one of the plurality of registration marks.

2. The web of claim 1, including a pattern of variable or personalized patterns formed by laser cutting a pattern in the conductive layer.

3. The web of claim 2, including a second pattern of variable or personalized information that is separate from the conductive structures.

4. The web of claim 1, wherein the conductive structures are antennas.

5. The web of claim 1, wherein the adhesive layer is provided in a pattern which corresponds to a shape of a conductive structure.

6. The web of claim 1, wherein the conductive layer is made out of one of a group selected from aluminum, copper, silver, gold or alloys of metals.

7. The web of claim 1, wherein the adhesive layer is transparent.

8. The web of claim 1, wherein the registration marks are provided in a machine direction.

9. The web of claim 1, wherein the adhesive layer is flood coated on the substrate.

10. The web of claim 9, wherein areas of the adhesive layer are deadened where conductive structures are not formed.

11. The web of claim 10, wherein the areas are deadened by a UV source.

12. A substrate having a conductive structure, comprising;
   a substrate having first and second parts and first and second faces;
   a plurality of patterned registration marks provided on the first face of the substrate, the plurality of registration marks each provided with an optical brightener;
   a layer of transparent adhesive on top of at least a portion of the first part of the first face;
   a conductive layer over the top of the layer of transparent adhesive;
   a conductive pattern provided in the first part, the conductive pattern formed by laser die cutting of the conductive layer; and
   indicia provided on the second part of the first face, the indicia formed by laser die cutting;
   wherein the conductive pattern and the indicia are aligned by reference to the plurality of patterned registration marks.

13. The substrate of claim 12, wherein the optical brightener is a fluorescent powder.

14. The substrate of claim 13, wherein the fluorescent powder is 1% of the total weight of the adhesive layer.

15. The substrate of claim 13, wherein the optical brightener includes UV detectable elements.

16. A web of conductive structures comprising:
   a substrate having first and second faces;
   a layer of adhesive having active areas and deadened areas, the adhesive layer provided on the substrate first face;
   at least one registration mark is within the adhesive layer wherein the at least one registration mark is provided with at least one optical brightener;
   a conductive layer provided over the active areas of the layer of adhesive;
   at least one conductive structure formed by laser cutting of the conductive layer; and
   wherein the at least one conductive structure is aligned with the at least one registration mark.

* * * * *